UNITED STATES PATENT OFFICE.

WILLIAM PERCY JONES, OF ST. MARTINS, AND HENRY MONTAGUE BATES, OF LONDON, ENGLAND.

MATCH.

SPECIFICATION forming part of Letters Patent No. 653,349, dated July 10, 1900.

Application filed November 13, 1899. Serial No. 736,805. (No specimens.)

*To all whom it may concern:*

Be it known that we, WILLIAM PERCY JONES, residing at Manaccau Board School, St. Martins R. S. O., in the county of Cornwall, and HENRY MONTAGUE BATES, residing at 31 Elgin Crescent, Bayswater, London, England, have invented a new and useful Composition of Matter to be Used for the Manufacture of Matches, of which the following is a specification.

Our invention relates to a new or improved match composition which is free from phosphorus and poisonous ingredients.

There are no noxious fumes in the process of manufacture of our match and no danger of explosion while mixing the ingredients.

In carrying out our invention we employ the following substances or materials as ingredients for the composition of our match: chlorate of potash, (ground,) three and one-half parts by measure; sulphide antimony, (ground,) one-half part by measure; thiosulphate of tin, (copper, bismuth, or other heavy metal,) (ground,) one part by measure; oxide manganese, (ground,) one-fifth part by measure; bichromate potash, (ground,) one-eighth part by measure; glass powder, (ground,) one-fourth part by measure. The chemicals should all be ground separately to the finest powder and should be mixed by being put two or three times through a sieve. For every hundred parts, by weight, of this mixture take half a part, by weight, of red prussiate of potash and add it to the mixture, which is then to be made into a stiff paste with water. It is then added to the requisite quantity of melted gelatin in the usual way, after which the paste must not be allowed to get either too hot, which will decompose the ingredients, or too cold, which will set the glue. The temperature should be just sufficient to keep the composition in a workable condition and should be kept constant. About that of new milk will be found correct.

In place of the glass powder we may use any equivalent inert substance, such as whiting or plaster-of-paris, and in place of the gelatin we may use any equivalent adhesive material, such as glue.

Should the gelatin or other ingredients become acid, as is sometimes the case, this acidity must be neutralized by means of dilute ammonia. A good plan to insure the composition being free of acid is to soak the glue in very dilute ammonia before melting it.

We are aware that so-called "non-phosphorus" matches have been patented before; also, matches that strike anywhere; but so far as we are aware there has not been any match which has no phosphorus of any kind whatever in its ingredients, is absolutely non-poisonous, and which will strike anywhere.

What we claim, and desire to secure by Letters Patent of the United States, is—

A non-poisonous composition for match tops, comprising chlorate of potash, sulphide of antimony, a metallic thiosulphate, oxide of manganese, bichromate of potash, an inert substance, red prussiate of potash, and adhesive material, substantially in the proportions set forth.

WILLIAM PERCY JONES.
HENRY MONTAGUE BATES.

Witnesses:
S. CHEESWRIGHT,
OLIVER LLOYD.